US009064028B2

(12) United States Patent
Shen et al.

(10) Patent No.: US 9,064,028 B2
(45) Date of Patent: Jun. 23, 2015

(54) CUSTOM RENDERING OF WEBPAGES ON MOBILE DEVICES

(75) Inventors: Vincent Yun Shen Shen, Hong Kong (CN); Benfeng Chen, Bellevue, WA (US); Dan Hong, Hong Kong (CN); Kwok Chu Lo, Hong Kong (CN); Yongzhen Zhuang, Shanghai (CN)

(73) Assignee: THE HONG KONG UNIVERSITY OF SCIENCE AND TECHNOLOGY, Kowloon, Honk Kong (CN)

( * ) Notice: Subject to any disclaimer, the term of this patent is extended or adjusted under 35 U.S.C. 154(b) by 662 days.

(21) Appl. No.: 12/450,601

(22) PCT Filed: Apr. 3, 2008

(86) PCT No.: PCT/CN2008/000673
§ 371 (c)(1),
(2), (4) Date: Nov. 6, 2009

(87) PCT Pub. No.: WO2008/122202
PCT Pub. Date: Oct. 16, 2008

(65) Prior Publication Data
US 2010/0077321 A1 Mar. 25, 2010

Related U.S. Application Data

(60) Provisional application No. 60/921,671, filed on Apr. 4, 2007.

(51) Int. Cl.
*G06F 3/048* (2013.01)
*G06F 17/30* (2006.01)
*H04L 29/08* (2006.01)

(52) U.S. Cl.
CPC ...... *G06F 17/30905* (2013.01); *H04L 67/2828* (2013.01); *H04L 67/28* (2013.01)

(58) Field of Classification Search
CPC .......... G06F 3/04842; G06Q 30/0601; G06Q 20/4097
USPC ........................................................ 715/760
See application file for complete search history.

(56) References Cited

U.S. PATENT DOCUMENTS 7,167,899 B2    1/2007  Lee et al.
7,296,213 B2 *  11/2007 Vainsencher et al. ......... 714/784
(Continued)

FOREIGN PATENT DOCUMENTS

CA    2479606 A1   2/2006
CN    1357846 A    7/2002
(Continued)

OTHER PUBLICATIONS

Tris Hussey, Here's How to Resize Youtube Videos to Fit Your Blog Layout, Oct. 20, 2006. http://www.gadgetizer.com/2006/10/20/heres-how-to-resize-youtube-videos-to-fit-your-blog-layout/.*
(Continued)

*Primary Examiner* — Amy Ng
*Assistant Examiner* — Di Xiao
(74) *Attorney, Agent, or Firm* — Nath, Goldberg & Meyer; Jerald L. Meyer; Stanley N. Protigal

(57) ABSTRACT

Webpages configured for display on a full-sized screen such as a computer monitor (111) are reconfigured for use with a mobile device in accordance with a user's preferences. A custom rendering tool engages the user in customizing the webpage in order to render the webpage information suitable for display on a mobile device. A browser toolbar is used, by which the user may highlight a section of interest section (121) from a webpage and save the customization information. A proxy server receives the customization information and uses the information to accurately retrieve the sections of interest later, even after the webpage or the section has been updated.

15 Claims, 5 Drawing Sheets

(56) References Cited

U.S. PATENT DOCUMENTS

| | | | |
|---|---|---|---|
| 2002/0059166 A1 | 5/2002 | Wang et al. | |
| 2003/0187988 A1 | 10/2003 | Lee et al. | |
| 2004/0133595 A1* | 7/2004 | Black | 707/103 Y |
| 2005/0085244 A1 | 4/2005 | Choi et al. | |
| 2005/0273496 A1 | 12/2005 | Jean et al. | |
| 2006/0047743 A1 | 3/2006 | Yuan et al. | |
| 2006/0184894 A1* | 8/2006 | Daniels et al. | 715/783 |
| 2007/0061486 A1 | 3/2007 | Trinh et al. | |
| 2007/0073777 A1 | 3/2007 | Werwath et al. | |
| 2007/0074111 A1* | 3/2007 | Firshein et al. | 715/530 |
| 2008/0280588 A1* | 11/2008 | Roundtree et al. | 455/405 |

FOREIGN PATENT DOCUMENTS

| | | |
|---|---|---|
| CN | 1752979 A | 3/2006 |
| CN | 1936904 A | 3/2007 |

OTHER PUBLICATIONS

Alexa. "Alexa web search—top 500". http://www.alexa.com/topsites.

Baluja, S., "Browsing on small screens: recasting web-page segmentation into an efficient machine learning framework". In WWW '06: Proceedings of the 15$^{th}$ international conference on World Wide Web, pp. 33-42, Edinburgh, Scotland, 2006. ACM Press.

Chen, Y., et al., "Detecting web page structure for adaptive viewing on small form factor devices". In WWW '03: Proceedings of the 12$^{th}$ international conference on World Wide Web, pp. 225-233, Budapest, Hungary, 2003. ACM Press.

Grassel, G., et al., "The nokia open source browser". http://www.research.att.com/~rjana/MobEA-IV/PAPER/MobEA_IV-Paper_3.pdf.

W.G.G. In Hkust. Mobil browsing evaluation form. http://comp101.cse.ust.hk/Joomla/index.php?option=com_facileforms&Itemid=61, Sep. 2006.

Milic-Frayling, N., et al., "Searchmobil: Web viewing and search for mobile devices". In WWW (Posters), 2003.

Opera. "Opera mini simulator". http://www.opera.com/mini/demo/, Nov. 2009.

Opera. "Opera mobile: Spinning the web into handsets", Nov. 2006.

W3C. "Cascading style sheets (home page)". http://www.w3.org/Style/CSS/.

W3C. "Mobile web best practices 1.0". http://www.w3.org/TR/mobile-bp/, Jun. 2006.

Wikipedia. "Rss (file format)". http://en.wikipedia.org/wiki/RSS (file format).

Woodruff, A., et al., "Using thumbnails to search the web". In CHI '01: Proceedings of the SIGCHI conference on Human factors in computing systems, pp. 198-205, Seattle, Washington, United States, 2001. ACM Press.

* cited by examiner

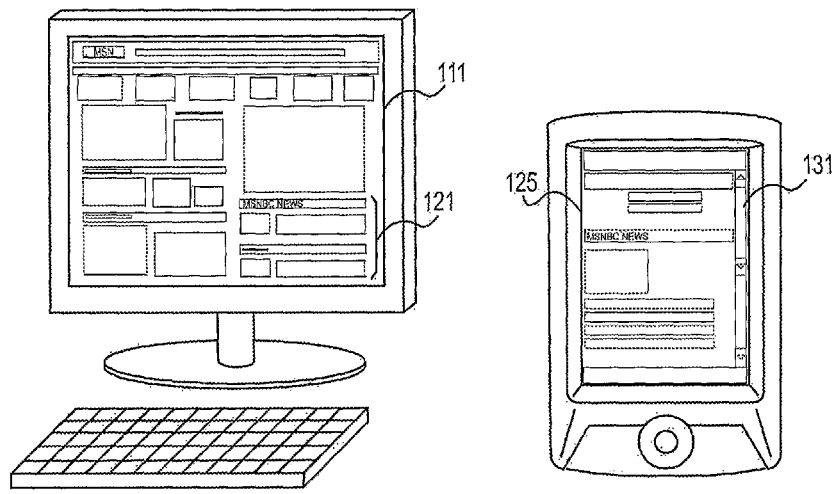
FIG. 1A   FIG. 1B
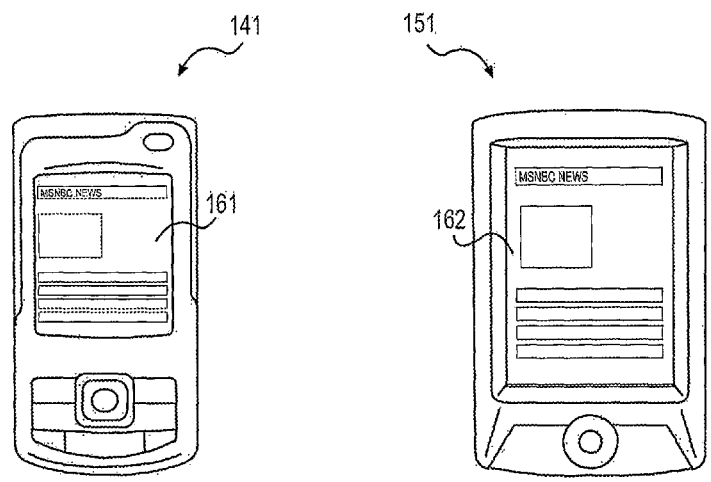
FIG. 1C   FIG. 1D

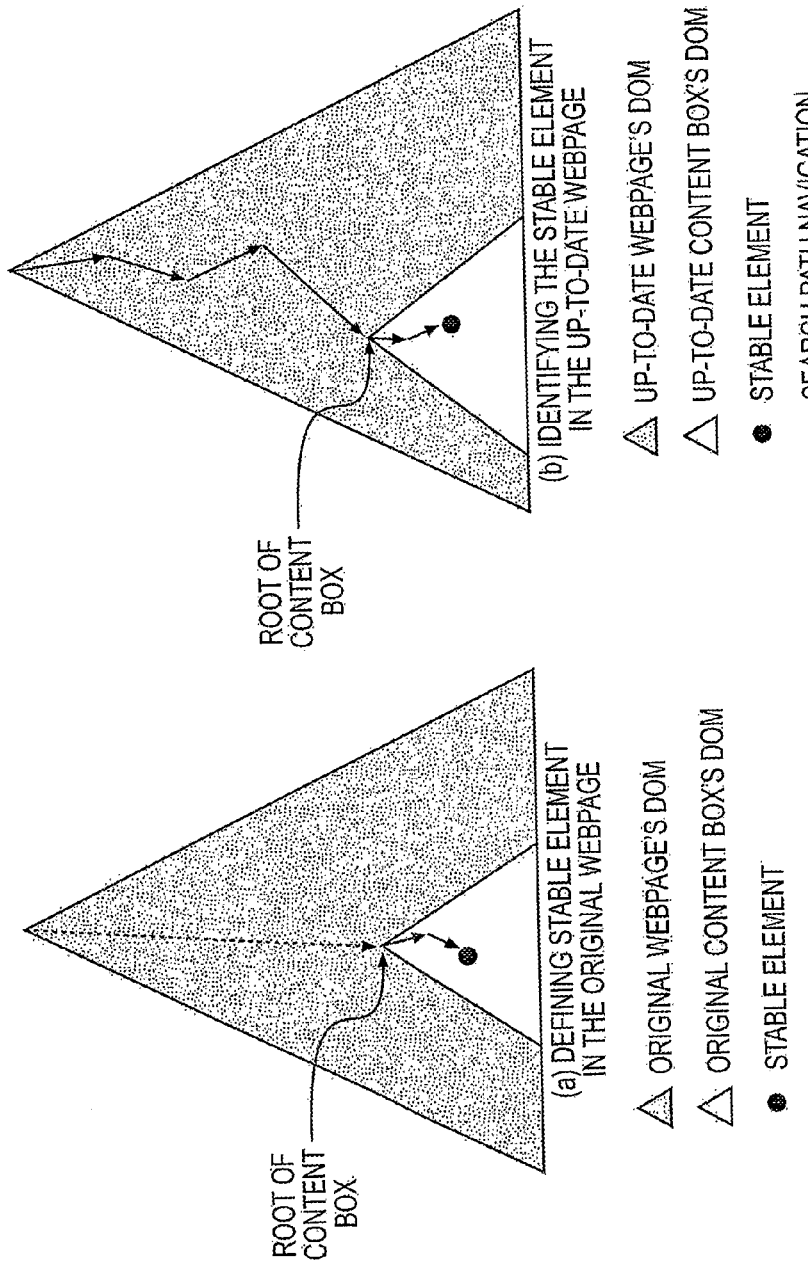

CUSTOM RENDERING OF WEBPAGES ON MOBILE DEVICES

This is a National Phase Application filed under 35 U.S.C. 371 as a national stage of PCT/CN2008/000673, filed on Apr. 3, 2008, an application claiming the benefit under 35 U.S.C. 119(e) U.S. Provisional Application No. 60/921,671, filed on Apr. 4, 2007, the entire content of each of which is hereby incorporated by reference in its entirety.

FIELD

The present subject matter relates to custom rendering of webpages on mobile devices.

BACKGROUND

Since more and more mobile phones provide web browsing capability, more and more people are using mobile phones to access the web. However, the small display screen and the limited input capabilities of mobile devices often do not give the user a satisfactory browsing experience. Although many attempts are being made to address this problem, such as through re-authoring or pre-processing by the browser before rendering, fitting a complex webpage designed for the desktop computer into the screen of a mobile device remains a great challenge.

Browsing the web using a mobile device does not often lead to a satisfactory experience, since most existing webpages are designed for access by a desktop or notebook computer which has a large screen. For a mobile device, it is difficult to:

1. fit a webpage to a small screen, typically less than 400 pixels in any dimension;
2. navigate the webpage using the scrolling buttons and a small keypad.

Although current problems of processing power and communication bandwidth of mobile devices will be solved in due course, the small screens and limited input facilities are features that will remain as a challenge. Several approaches have been proposed to process ordinary webpages for mobile web browsing: one solution is "small screen rendering" (SSR) or "narrow layout", which reorganizes the webpage to a long and thin column in order to fit the width of the devices [8]. Another approach uses "thumbnail" or "overview plus detail" (OPD), displays. When implementing the "thumbnail" or "overview plus detail" (OPD) display, the whole webpage appears on the screen as a thumbnail image and allows zooming into a particular section. The Mobile Web Initiative of the World Wide Web Consortium (W3C) offers design tips, called "best practices" (hereafter referred to as the "W3C Best Practices Recommendation"), intended to make either the SSR or the OPD approach work better, provided the webpage designer has possible rendering on mobile devices in mind.

Both the SSR and OPD approaches have similar disadvantages. Both transmit much more content to the mobile device than the user actually wants. Therefore, if the user is interested in only a small section of a webpage, which is often the case, it may take too much time and navigation effort to find that section. A good browsing experience occurs when users can see the requested content soon after the page has been loaded, without excessive scrolling or clicking through multiple links.

A further disadvantage is inherent in the more limited scope of information provided on a mobile device display. When a webpage is created, the webpage creator attempts to optimize display "real estate" to provide a combination of necessary information and ancillary information on the screen. To the extent that whatever information desired by the user is easily accessed by the user, the ancillary information is ignored (or sometimes blocked). The SSR and OPD renderings may or may not provide the information desired by the user either because the webpage creator cannot anticipate what the information desired by the viewer is or because the desired information varies from viewer to viewer. In addition, commercial considerations may mitigate against the webpage creator providing concise information for possible displaying on a small screen.

SUMMARY

Web content is rendered for display on a mobile device in a manner determined by a user. An association of webpage views presented to a user is established and a selection function is provided to allow the user to select elements of the webpage for display on a mobile device. A determination is made of webpage elements associated with the user selection and an indication of the selection of the elements is displayed in accordance with the user selection. Criteria for the selection of the webpage elements for the rendering on the mobile device are provided for storage on a proxy server. The selection of the webpage elements, in association with updated content information, is then retrieved by the mobile device.

BRIEF DESCRIPTION OF THE DRAWINGS

The features of the present technique will now be described with reference made to the accompanying drawings, in which:

FIG. 1 is a depiction of representative samples of a webpage displayed on a desktop and on mobile devices;

FIG. 5 is a diagram showing "content box" identification by the "custom rendering and mobile device display" proxy server;

DETAILED DESCRIPTION

Overview

Figure 2:
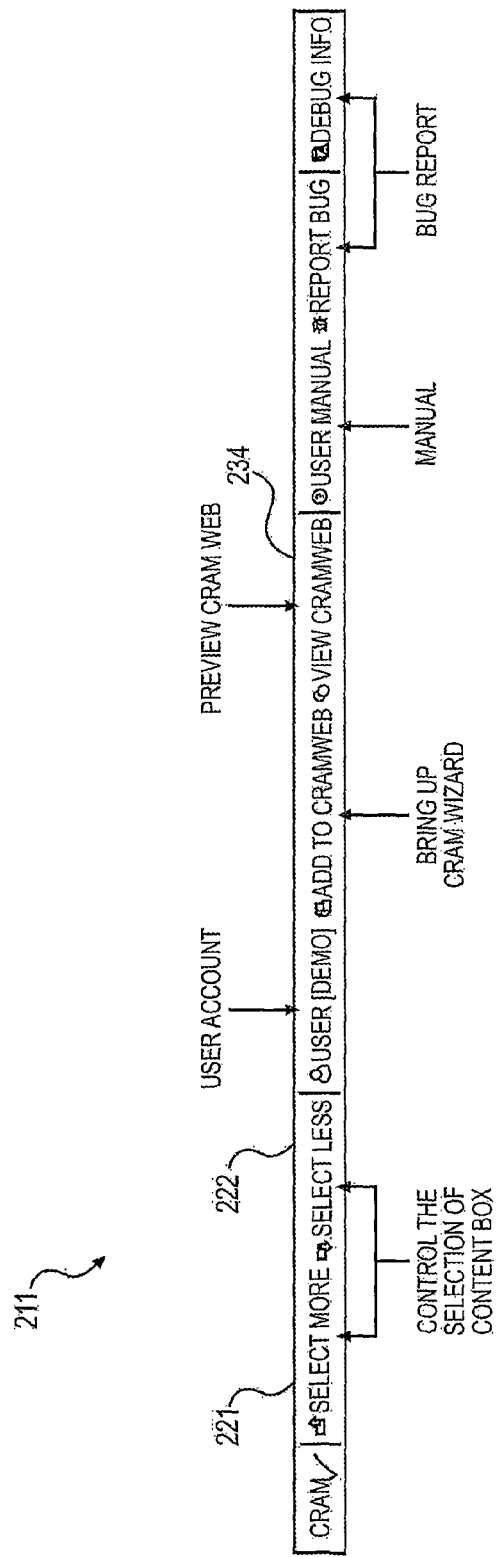
FIG. 2 is a depiction of an example of a "custom rendering and mobile device display" toolbar.

The present approach is to add a customization step for favorite webpage contents before viewing the contents on a mobile device. It will complement any of the earlier approaches to improve the web browsing experience. This provides an approach that engages the user in defining the content of interest, called a "content box". The "content box" provides an optimum way to make good use of the small display screen, to reduce the local processing and navigation effort, and to reduce the cost and time of content transmission to the mobile device. The definition of the "content box" is typically made on a PC or other device affording convenient selection of the contents of a webpage.

The PC provides sufficient video "real estate" or video screen space to view contents of the webpage in a manner suitable for selection of content elements. In addition, the PC provides the ability to provide toolbars and additional display functions that can be easily manipulated, for example by keyboard and pointing devices associated with PCs. This allows the user to select elements of the webpage for display on the mobile device, which typically has reduced video real estate as compared to the video real estate available to the user when selecting elements of the webpage on the PC.

This approach is referred to as "custom rendering and mobile device display" (CRAM). FIG. 1A shows the webpage http://www.msn.com displayed on a PC screen 111. If the user is only interested in a section of the webpage 121 ("MSNBC News" on the lower right hand corner of the screen) and browses it on a personal digital assistant (PDA) using the SSR approach, the result is display 125 shown in FIG. 1B. Note the presentation of a scroll bar 131 on the right to let the user find the content of interest (approximating 121 in FIG. 1A). It will take time to scroll to the desired content, and it is easy to over-scroll. Such actions do not provide a good browsing experience. FIGS. 1C and D show the same content of interest ("MSNBC News") on a mobile phone 141 and on a PDA 151 as displays 161, 162. Displays 161, 162 are obtained by using the "custom rendering and mobile device display" (CRAM) approach. Note that no scrolling to find the content of interest is necessary, although it may be that a scrolling feature may still be used within the "content box" itself. It has been found that browsing webpages using the CRAM approach could provide a good user experience, and could become a useful service offered by mobile phone operators or independent service providers. The present approach includes getting user input concerning which "content box" is important and interesting to the particular user, and retrieving the selected "content box" later from updated webpages with up-to-date content.

To address the problem of allowing webpages, designed for standard sized screens to be viewed on mobile devices, a "custom rendering and mobile device display" tool (CRAM tool) is provided. The CRAM tool engages the user in customizing a webpage for displaying on a mobile device. A "custom rendering and mobile device display" toolbar (CRAM toolbar) is provided for a browser through which a user may highlight the interested section of a webpage and save the customization information. A "custom rendering and mobile device display" proxy server (CRAM proxy server) uses the customization information to accurately retrieve the interested section later, even after the webpage or the section has been updated. The efficacy of this approach has been demonstrated through prototype implementation and empirical analysis.

Software Tool

Figure 3:
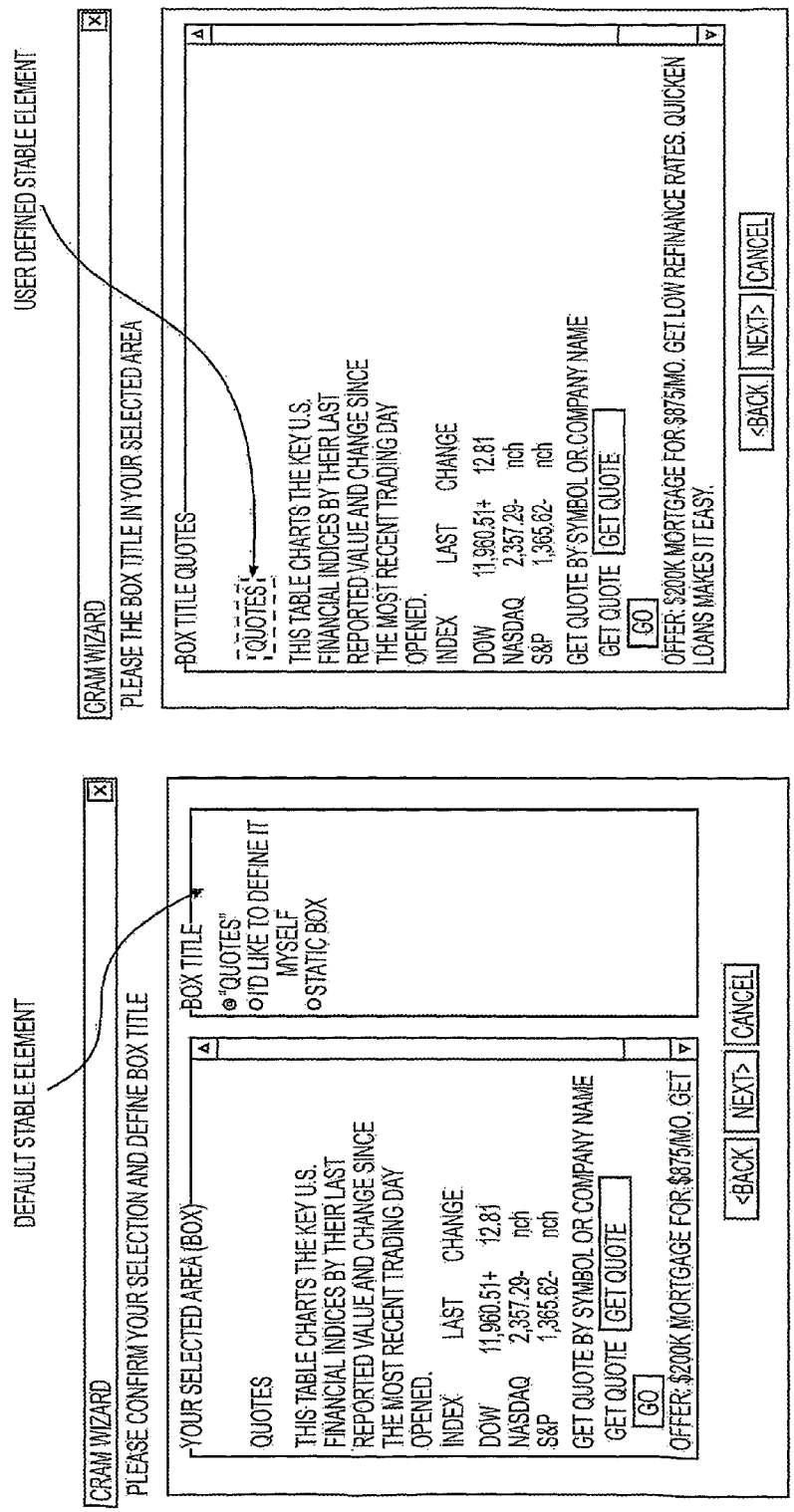
FIG. 3 is a depiction showing the stable element selection using "custom rendering and mobile device display" toolbar.

FIG. 2 is a depiction of an example of a CRAM toolbar. FIG. 3 is a depiction showing the stable element selection using a CRAM toolbar. The CRAM toolbar is typically accessed by the user through a PC or other easily controlled user interface, although it is possible to perform toolbar functions on a mobile device. The CRAM tool is a custom rendering tool for mobile devices, to enable the mobile device user to retrieve only the particular web content of interest (the "content box") to a format suitable for the small mobile screen. In other words, the tool "crams" the pre-selected content boxes into the mobile screen with updated content. The tool has two parts:
1. the CRAM toolbar and
2. the CRAM proxy server.

The CRAM toolbar is an addition to a browser, typically running on a desktop machine. The custom rendering is designed to enable users to select content boxes of interest from frequently accessed webpages and save the customization information on the CRAM proxy server. The users then access the proxy server to retrieve the up-to-date content boxes later, typically using a mobile device. The "content box" retrieved is an HTML document or other web-compatible document produced by the proxy server containing only the information of interest, which is normally much smaller than the original webpage. It will be rendered by the native browser of the mobile device using any of the approaches (SSR, OPD, or others). The technique includes the ease of use of the CRAM toolbar, and the accurate retrieval of selected content boxes later through the CRAM proxy server.

While "HTML" is described herein, it is understood that other markup languages and other languages intended for web rendering can be used and configured as "content boxes". Therefore the CRAM approach can be operated in association with other languages suitable for web-based display.

The CRAM tool is accessible from a computer with a full-sized screen, although it is also possible to provide a complementary tool for use on a mobile device. One advantage of having the custom rendering for mobile devices toolbar accessed on a full-sized screen is to provide normal full-sized screen access to the webpage, and to make it easier to define the "content box" on the full-sized screen of the computer, typically with the aid of a mouse or other pointing device and a full-sized keyboard. This facilitates the user being able to select webpage sections in a manner which allows the desired arrangement of the "content box".

The CRAM tool also is able to parse HTML elements in such a way as to display portions of the webpage suitable for selection. Examples of suitable portions would be a paragraph with a heading, a table cell, etc. Examples of less suitable elements would be an attempt to select a portion of a webpage that terminates mid-paragraph. Since it is possible to select portions of a webpage which are not self-contained elements of the HTML, the CRAM tool identifies appropriate closing tags and the equivalent in order to render complete webpage elements as the "content box". Also, since the "content box" is only part of the webpage, the CRAM tool permits the user to selectively delete items such as advertisements, in order to render the "content box" efficiently.

On both the custom rendering for mobile devices tool and on the mobile device, the selection of content boxes is similar to the setting of "Favorites" in Microsoft Internet Explorer® or "Bookmarks" in Mozilla Firefox™ and other browsers. The difference is that, in the case of an output generated by custom rendering for mobile devices, only the "content box" part of the webpage is rendered.

The CRAM toolbar 211 has been implemented on a platform-independent browser, such as Mozilla Firefox™, for platform independence and on a proprietary browser, such as Microsoft Internet Explorer®. The CRAM toolbar uses the normal browser's selection feature for "content box" selection by simply highlighting the contents in the box. After the user has highlighted the "content box" and confirmed its selection, the CRAM toolbar saves the customization information in XML for later retrieval by the CRAM proxy server. The CRAM toolbar (FIG. 2) has some additional features:
1. Users can control the size of selected "content box" by using the "Select More" or "Select Less" buttons 221, 222 on the toolbar. "Select More" 221 will choose the parent-level box in the Document Object Model (DOM) tree in the HTML or XML document for the original webpage (e.g., display 111), and select less will choose the first child-level box. The first child-level box is a subset of the original webpage 111, and can be a particular selection such as selection 121.
2. Users can define an unlimited number of content boxes, which are referred to as "channels" in a user sequence, called, "the CRAM wizard". The CRAM wizard (FIG. 3) allows the user to define an element that is believed to be "stable"; i.e., it does not change even if the rest of the content may change over time. Each selected box is then identified by a unique number in the channel list. Boxes with smaller numbers will be shown near the beginning of the "custom rendering and mobile device display" web list of channels. Channels are reusable. As a practical matter, web designers attempt to use stable design elements, which results in reproducibility of the "content box" even though the material within the "content box" may change.

3. Users can preview the list of channels stored in the CRAM proxy server using a "View CRAM Web" button 234 as shown in FIG. 2.
4. Users are provided with a facility to send error reports. The error reports are used for tuning of the "custom rendering and mobile device display" tool.

A debug function is provided. The debug function includes a "learning module" to permit applying the same bug correction to future instances of similar bugs.

Another feature is the ability to render "plug-in" media in a suitable format. Since the "content box" is ultimately delivered by the CRAM proxy server, the proxy server may be able to render the "plug-in" data in a format compatible with the portable device. This can be achieved either by an alternate format provided by the content provider, or by providing a converted output from the CRAM proxy server.

Customization Information

The customization information produced by the CRAM toolbar is transferred to the CRAM proxy server in the following XML format:

```
<craminfo>
<user>user's ID</user>
<crambox>
<label>box's title</label>
<channel>channel number of this box</channel>
<id>HTML id</id>
<stable>stable element</stable>
<source>original (actually, Firefox rendered)
    source code of the content box</source>
</crambox>

<url>URL of the original webpage</url>

</craminfo>
```

Tags
<user>—This is the user's ID that uniquely identifies the set of content boxes (called channels) selected by him.
<label>—This is the title for the content box, which is used as the title of the webpage generated by the proxy server for the up-to-date content box. The user can identify the webpages of different content boxes using this title.
<channel>—This is the channel number for the "content box" in the "custom rendering and mobile device display" web list of channels (CRAM web).
<class>—This is the value of the "class" attribute of the HTML element, which is the first element of the DOM sub-tree corresponding to the selected content box. If there is no "class" attribute, this XML tag will be empty.
<id>—This is the value of the "id" attribute of the HTML element, which is the first element of the DOM sub-tree corresponding to the selected content box. If there is no "id" attribute, this XML tag will be empty.
<stable>—This is the default or user-selected stable element for identifying the content box. This is part of the sub-tree in the HTML DOM tree corresponding to the selected content box.
<stableinfo>—This is the detailed information about the stable element, such as the parent elements and sibling elements, to help identify the selected content box when the same stable element is used multiple times in the webpage.
<source>—This is the HTML code segment of the original user-selected content box. This will be referenced when the proxy server extracts the up-to-date information for the content box.
<url>—This is the URL of the original webpage.

The preceding sample XML code is substantially simplified and is not limiting to the present subject matter. It is expected that various formatting and style elements would be included and will allow convenient access or modification to the "content box".

The XML file from the CRAM toolbar and the content of the up-to-date webpage are inputs to the CRAM proxy server. At the proxy server, these inputs are transformed into HTML DOM trees and processed. The content inside the big box "Matching" shown in the diagram performs the content matching. Finally, the matched content is transformed into an HTML webpage and sent to the mobile device.

Figure 4:
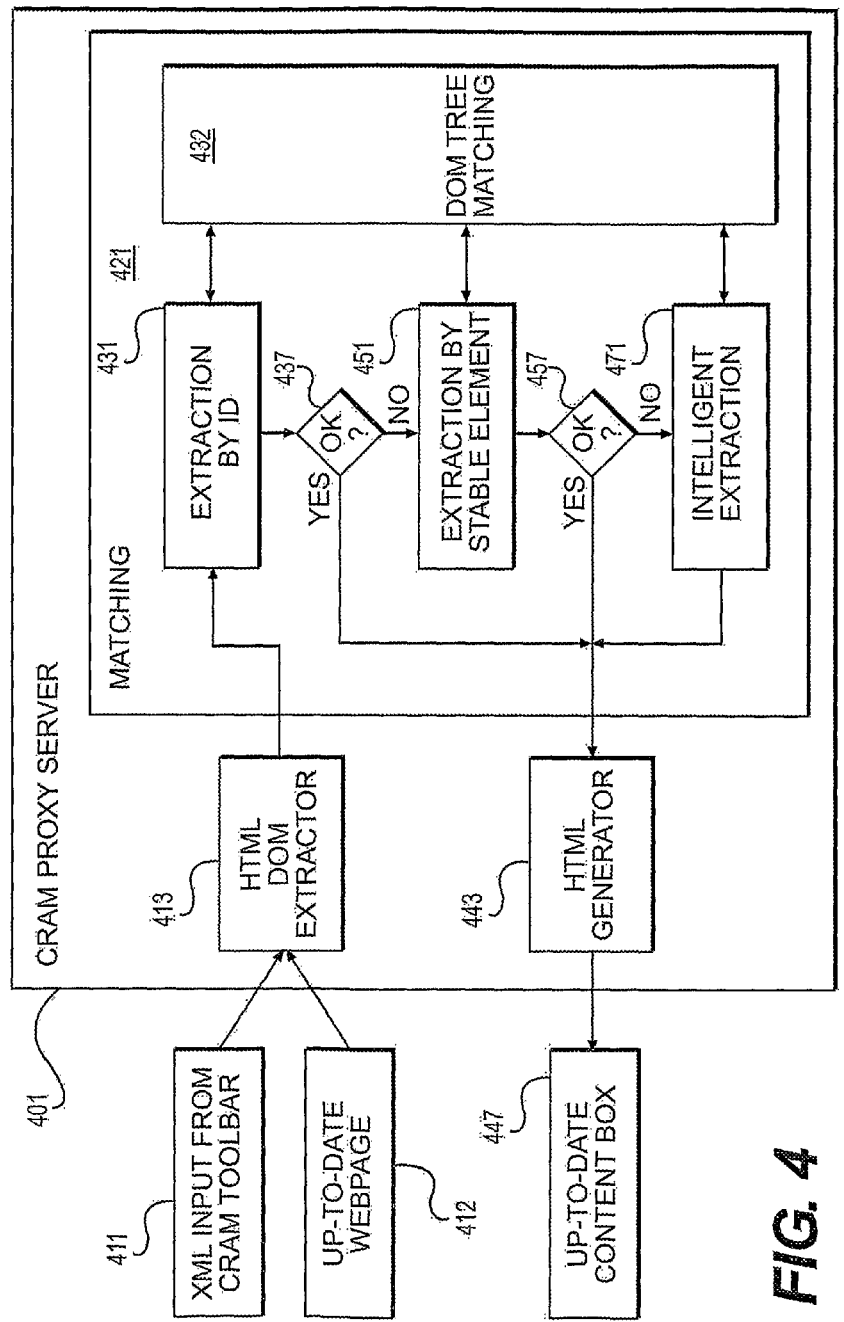
FIG. 4 is a diagram showing the flow of documents in the "custom rendering and mobile device display" proxy server.

A non-limiting example of the CRAM proxy server is depicted using the structure described in FIG. 4. The CRAM proxy server identifies the content boxes by two major approaches:

1. Extracting by "id" or "class"—
    If the input XML file from CRAM toolbar contains the <id> or <class> tag, the proxy server will visit the up-to-date webpage and extract the HTML DOM sub-tree of which the root contains that value for its "id" or "class" as an attribute. This sub-tree is used to generate a small HTML document and sent to the mobile device.
2. Extracting by Stable Element—
    If the <id> or <class> tag mentioned above is empty, the CRAM proxy server will try to locate the stable element in the up-to-date webpage, and then extract an HTML DOM sub-tree containing that stable element. The sub-tree should have a structure similar to that of the HTML DOM sub-tree of the selected "content box" in the original webpage, which is represented in the <source> node. The details of the DOM tree for the up-to-date webpage are not considered in the matching to allow updates for the webpage. But the parent and grandparents of the located stable element in the up-to-date webpage are compared in order to increase the accuracy of extraction.

Referring to FIG. 4, CRAM proxy server 401 receives XML input 411 from the CRAM toolbar and an up to date webpage from a web server 412. An HTML DOM extractor 413 uses the XML input to extract web content and provides the extraction to a matching content server 421. Extraction by ID (or CLASS) is provided (box 431) and is checked against DOM tree matching (box 432). A determination 437 is made whether the extraction by ID (or CLASS) is acceptable, meaning whether it generates a meaningful rendering of a "content box" as specified by the CRAM toolbar. If the extraction by ID (or CLASS) is acceptable, the output is provided to an HTML generator 443, which in turn outputs an up-to-date "content box" 447. If the extraction by ID (or CLASS) is not accepted, an extraction is made by stable element (box 451) and is checked against DOM tree matching (box 432). A determination 457 is made whether the extraction by stable element is acceptable, meaning whether it generates a meaningful rendering of a "content box" as specified by the CRAM toolbar. If the extraction by stable element is acceptable, the output is provided to HTML generator 443 and output as up-to-date "content box" 447. If the extraction by stable element is not accepted, an intelligent extraction is made (box 471) and is checked against DOM tree matching (box 432). The intelligent extraction is provided to HTML generator 443 and output as up-to-date "content box" 447.

When a user accesses the CRAM proxy server to perform an extraction, the server needs to match the id, class, or the stable element in the up-to-date webpage so as to locate the up-to-date content box, which is a sub-tree in the DOM tree. The matching procedure compares the DOM structure of the stable element and the up-to-date webpage by navigating the trees in a top-down manner.

The DOM tree in FIG. 5A represents an original webpage, where the user has specified the original "content box" and the stable element. This customization information is then used by the CRAM proxy server in the real-time extraction process as shown in FIG. 5B. The proxy server navigates down the DOM tree of the up-to-date webpage, and eventually reaches and matches the stable element. The server then back-tracks the search path to identify the root of the sub-tree for the up-to-date "content box" by comparing the nodes' names along the search paths on both DOM trees shown in FIG. 5. The proxy server then extracts and outputs the up-to-date content box. Additional steps are sometimes needed to fine-tune the matching process to ensure an accurate extraction.

In customization of a display for a mobile device by a user context, the use of "stable" elements found in the original webpage is useful. The CRAM Wizard allows the user to define an element that is believed to be "stable". The "stable" element is selected on the basis of it not being likely to change even though the rest of the content may change over time. Typically this visually appears as a section of the webpage as visually displayed, although the CRAM tool can be useful in identifying webpage elements for selection for inclusion in the "content box".

This way, as an example, even if a link to "Yahoo Finance" was specified as content for customization information from the "Yahoo" homepage, but the "Yahoo" homepage eventually changes as advertisements and other contents change, the position of "Yahoo Finance" on the page changes relative to other links, etc. Therefore, the content can still be found as a "stable" element through the DOM matching process.

The following examples demonstrate the efficacy of the CRAM tool. These examples are for illustrative purposes and are not to be construed as limiting the present subject matter to any particular embodiment. Three examples are:

Example 1

User Experience

A user experience experiment was conducted during September, 2006, in a laboratory class involving 139 undergraduate students. The participants had 6.8 years of desktop web browsing experience on average and over 65% of them had mobile web browsing experience before the experiment was conducted. Each participant was given five tasks as shown in Table 1. In each of these tasks, the participant was requested to use the Opera Mini Simulator to browse a target "content box" of an original webpage first, and use the CRAM toolbar to select the content box. The selected box was browsed later through the CRAM proxy server also using the Opera Mini Simulator. An on-line questionnaire was filled in by the participants after the experiment. They were requested to comment on the two browsing methods: browsing the original webpage for the requested content box, and browsing the "content box" through the CRAM proxy server. 85% of the participants commented that they preferred browsing through custom rendering for mobile devices (CRAM). They agreed that CRAM is helpful in saving browsing time, especially for the content boxes read frequently.

The user contents provided for the user experience tasks provided "content box" entries which could be implemented from a menu of selections corresponding to "Bookmarks" or "Favorites", but which are used to identify specific "content box" entries. Unlike "Bookmarks" or "Favorites", in the case of an output generated by custom rendering for mobile devices, only the "content box" part of the webpage is selected. In the example, this is presented as:

TABLE 1

| User experience evaluation tasks | |
| --- | --- |
| URL | Content Box Title |
| http://www.msn.com/ | MSNBC News |
| http://www.about.com | Today's most talked about |
| http://www.go.com Finance by ABCNews | Finance by ABCNews |
| http://www.cse.ust.hk | News and events |
| http://www.bbc.co.uk/?ok | News |

Example 2

Selection Success Rate

A test of the homepages of the top 500 websites which were published by Alexa.com on Jul. 3, 2006, was tested. It was noted that many of these webpages, such as the homepage of some search engines, are not likely targets for customization. 5 participants were asked to review every website and identify the websites which in their subjective opinion have the potential to be customized. Those websites which were not in any of the lists constructed by the participants were removed and the remaining 210 websites were used as test data. For each website in the revised list, one "content box" was randomly selected and saved in a channel for processing by the CRAM proxy server. For the 210 websites tested, 196 of them were able to be easily customized using the CRAM toolbar for the randomly-selected box. The main reason for failure of the toolbar to provide a suitable "content box" in the remaining websites was considered to be related to the peculiar design of the webpage, such as using the HTML <table> element for layout in combination with the user desiring to select a column of the table.

Example 3

Longevity

The archived web data from http://www.archive.org was used. For this example, it was presumed that when users browse websites using a mobile device, they are more likely to visit news websites. The top ten news website list was obtained from alexa.com and traced the past web data to January 2004. A random selection was made of one box on the page dated January, 2004, and a check was made as to how long the box can be successfully extracted. On average, the selected boxes were extractable for 6.7 months.

The above indicated that the CRAM tool is effective in providing a very positive mobile web browsing experience with little additional work in customization.

The CRAM tool provides a technique for strategically teaching user creating the customization information from a PC. The customized information is then uploaded to a user id/password protected proxy server application. The user's mobile devices can then receive custom laid out content on the user's mobile phone by entering the user id/password from the mobile phone, i.e., the customization information need not be created from the mobile phone itself with the "custom rendering and mobile device display" (CRAM) architecture making for a better system than the prior art system.

In an alternate configuration, the user may make some or all of the customized content on the CRAM proxy server publically available.

By providing customization which includes both the PC and the mobile device, it is easier to switch customizations across client devices, even if the particular device configuration or user selections had not been anticipated prior to the use of the CRAM tool. This permits initiating the customization information from a first computer such as a PC where a rich UI browser experience enables a user to perform rich content layout and selection tasks via the CRAM toolbar, but where the PC doesn't really receive a benefit from doing so. Then the user is able to retrieve the customization information from a second device, such as a mobile device, where it is harder to create customization information, but easy to realize the benefit.

Instruction Sets

The subject matter may be embodied as a computer program product, provided as a computer-readable medium with appropriate software instructions. A first instruction establishes an association with a webpage view presented to a user. A second instruction causes the computer to provide a selection function such that the user may select elements of the webpage for display on a mobile device. A third instruction provides a function to determine webpage elements associated with the user selection. A fourth instruction causes the computer to display an indication of the selection of the elements with the webpage elements associated with the user selection. A fifth instruction is used for providing criteria for the selection of the webpage elements. This also allows for adjustment of the rendering so that the instructions for the rendering may be stored on a proxy server. A sixth instruction causes the computer to retrieve the selection of webpage elements from the proxy server in accordance with the stored selection of the webpage elements.

CONCLUSION

It will be understood that many additional changes in the details, materials, steps and arrangement of parts, which have been herein described and illustrated to explain the nature of the subject matter, may be made by those skilled in the art within the principal and scope of the subject matter as expressed in the appended claims.

What is claimed is:

1. A method of rendering web content not specifically configured for use on a mobile device, for display on a mobile device, the method comprising:
    establishing an association with a webpage view of a webpage not specifically configured for use on a mobile device for presentation to a user for display on the mobile device;
    providing a selection function whereby the user may select self-contained elements of the webpage, and determine webpage elements associated with the user selection according to a markup language DOM tree matching, for display on the mobile device;
    determining stable webpage elements associated with the user selection and rendering customization information corresponding to the user selection which permits the selection of elements of the webpage for display on a mobile device according to the markup language DOM tree matching;
    storing the customization information on a proxy server separate from the mobile device;
    displaying an indication of the selection of the elements for display on the mobile device with the webpage elements associated with the user selection;
    providing criteria for the selection of the webpage elements, including the adjustment of the rendering for storage on the proxy server;
    in response to the user selection, retrieving updated content information associated with the URL for association with the identified content elements for display on the mobile device according to the markup language DOM tree matching;
    generating a new markup document based on updating the markup document so as to incorporate changes in webpage content within the DOM structure according to the DOM tree matching, using extraction by stable element and checking the extraction against DOM tree matching; and
    determining whether the extraction by stable element generates a meaningful rendering of a content box containing webpage elements corresponding to webpage elements as specified by the user using a toolbar provided as a browser interface, and determined by parsing the webpage elements associated with the content box specified by the user, according to the markup language DOM tree matching, and in the case of a meaningful rendering, providing the content elements in association with the updated content information to the user; and
    retrieving the selection of webpage elements from the proxy server for rendering on the mobile device in accordance with the stored selection of the webpage elements.

2. The method of claim 1, further comprising:
    providing, as the selected elements of the webpage for display on the mobile device, a content box of reduced video real estate as compared to the video real estate available to the user when selecting elements of the webpage; and
    providing the user with a display indication corresponding to a rendering of the selected elements for display on the mobile device, wherein the display includes display criteria for the mobile device sufficient for the user to determine the appearance of the rendering on the mobile device.

3. The method of claim 1, further comprising:
    providing, as the selected elements of the webpage for display on the mobile device, a content box of reduced video real estate as compared to the video real estate available to the user when selecting elements of the webpage; and
    providing the user with a display indication corresponding to a rendering of the selected elements for display on the mobile device, wherein the display includes display criteria for the mobile device sufficient for the user to determine the appearance of the rendering on the mobile device, including a display layout of pixel elements of the mobile device.

4. The method of claim 1, further comprising:
    receiving, in association with the retrieved selection of webpage elements from the proxy server in accordance with the stored selection of the webpage elements, updated content information associated with at least one of the webpage elements selected by the user for display on the mobile device.

5. The method of claim 1, further comprising:
providing a menu containing an identification of the selection of webpage elements from the proxy server in accordance with the stored selection of the webpage elements, for retrieval on the mobile device.

6. The method of claim 1, further comprising providing a toolbar as a browser interface, the toolbar supporting a customization of the user selection without special training.

7. The method of claim 1, further comprising providing the selection function in a format which permits the selection of elements of the webpage for display on a mobile device according to a markup language DOM tree matching.

8. The method of claim 1, further comprising providing a proxy server to accurately retrieve selected content boxes using a markup language DOM tree matching.

9. The method of claim 1, further comprising the selection function including "Select More" and "Select Less" functions based on a Document Object Model (DOM) tree.

10. The method of claim 1, further comprising a debug function, wherein the debug function includes a "learning module" to permit applying a same bug correction to future instances of similar bugs.

11. A method of rendering web content of a webpage not specifically configured for use on a mobile device for presentation for use on the mobile device, the method comprising:
receiving a request identifying a website and identifying content elements associated with the web site for display on the mobile device, and determining webpage elements on the web site associated with the user selection according to a markup language DOM tree matching;
determining stable webpage elements associated with the identified content elements and rendering customization information corresponding to the identified content elements which permits the selection of elements of the webpage for display on a mobile device according to the markup language DOM tree matching;
storing information concerning a URL for the identified website and storing, at a proxy server separate from the mobile device, customization information corresponding to the identified content elements associated with the website;
storing an association of a user with the stored customization information concerning the URL and the information corresponding to the identified content elements;
receiving a request from the user for the webpage associating with a webpage view presented to a user;
providing a selection function whereby the user may select self-contained elements of the webpage for display on the mobile device;
determining webpage elements associated with the user selection;
in response to a user selection, retrieving updated content information associated with the URL for association with the identified content elements for display on the mobile device according to the markup language DOM tree matching;
generating a new markup document based on updating the markup document so as to incorporate changes in webpage content within the DOM structure according to the DOM tree matching, using extraction by stable element and checking the extraction against DOM tree matching;
determining whether the extraction by stable element generates a meaningful rendering of a content box containing webpage elements corresponding to webpage elements as specified by the user using a toolbar provided as a browser interface, and determined by parsing the webpage elements associated with the content box specified by the user, according to the markup language DOM tree matching, and in the case of a meaningful rendering, providing the content elements in association with the updated content information to the user; and
retrieving the selection of webpage elements from the proxy server for rendering on the mobile device in accordance with the stored selection of the webpage elements.

12. The method of claim 11, further comprising:
providing a menu selection association corresponding to the user selection, so as to permit the user selection in accordance with the menu selection for retrieval of the content elements in association with the updated content by the user.

13. A computer program product, comprising:
a non-transitory computer-readable medium comprising:
a first instruction for causing a computer to establish an association with a webpage view of a webpage not specifically configured for use on a mobile device for presentation to a user for display on the mobile device;
a second instruction for causing the computer to provide a selection function whereby the user may select self-contained elements of the webpage for display on the mobile device, and determining webpage elements associated with the user selection according to a markup language DOM tree matching;
a third instruction for causing the computer to receive a determination of stable webpage elements associated with the user selection and render customization information corresponding to the user selection which permits the selection of elements of the webpage for display on a mobile device according to the markup language DOM tree matching;
a fourth instruction for causing the computer to store the customization information on a proxy server separate from the mobile device;
a fifth instruction for causing the computer to display an indication of the selection of the elements with the webpage elements associated with the user selection;
a sixth instruction for causing the computer to provide criteria for the selection of the webpage elements for display on the mobile device, including the adjustment of the rendering, the criteria provided for storage on a proxy server;
a seventh instruction for, in response to the user selection, causing the computer to retrieve updated content information associated with the URL for association with the identified content elements for display on the mobile device according to the markup language DOM tree matching;
an eighth instruction causing the computer to generate a new markup document based on updating the markup document so as to incorporate changes in webpage content within the DOM structure according to the DOM tree matching, using extraction by stable element and checking the extraction against DOM tree matching; and
a ninth instruction causing the computer to determine whether the extraction by stable element generates a meaningful rendering of a content box containing webpage elements corresponding to webpage elements as specified by the user using a toolbar provided as a browser interface, and determined by parsing the webpage elements associated with the content box specified by the user, according to the markup language DOM tree matching, and in the case of a meaningful rendering, to provide the content elements in association with the updated content information to the user.

14. The computer program product of claim 13, further comprising:
an eighth instruction for causing the computer to provide a menu containing an identification of the selection of webpage elements from the proxy server in accordance with the stored selection of the webpage elements, for retrieval on the mobile device.

15. The computer program product of claim 13, further comprising a toolbar provided as a browser interface, the toolbar supporting a customization of the user selection without special training.

* * * * *